US010484754B2

(12) United States Patent
Rao

(10) Patent No.: US 10,484,754 B2
(45) Date of Patent: Nov. 19, 2019

(54) ADVERTISEMENT STATUS INDICATOR IN STB

(71) Applicant: ARRIS Enterprises LLC, Suwanee, GA (US)

(72) Inventor: Ananth Rao, Bengaluru (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/657,534

(22) Filed: Jul. 24, 2017

(65) Prior Publication Data
US 2019/0028777 A1 Jan. 24, 2019

(51) Int. Cl.
H04N 21/81 (2011.01)
H04N 21/431 (2011.01)
H04N 21/482 (2011.01)
H04N 21/234 (2011.01)
H04N 21/438 (2011.01)
H04N 21/845 (2011.01)
H04N 21/2362 (2011.01)
H04N 21/434 (2011.01)
H04N 21/488 (2011.01)

(52) U.S. Cl.
CPC ....... H04N 21/812 (2013.01); H04N 21/2362 (2013.01); H04N 21/23424 (2013.01); H04N 21/431 (2013.01); H04N 21/4312 (2013.01); H04N 21/4316 (2013.01); H04N 21/4345 (2013.01); H04N 21/4383 (2013.01); H04N 21/482 (2013.01); H04N 21/4821 (2013.01); H04N 21/4882 (2013.01); H04N 21/8456 (2013.01)

(58) Field of Classification Search
CPC ............ H04N 21/431; H04N 21/4316; H04N 21/2362; H04N 21/812
See application file for complete search history.

(56) References Cited

U.S. PATENT DOCUMENTS

| 6,708,335 | B1 * | 3/2004 | Ozer | H04N 7/163 348/E7.061 |
| 2002/0144274 | A1 * | 10/2002 | Gaviot | H04N 7/165 725/86 |
| 2008/0263595 | A1 * | 10/2008 | Sumiyoshi | H04N 5/44543 725/39 |
| 2009/0060469 | A1 * | 3/2009 | Olague | H04N 7/17318 386/297 |

(Continued)

Primary Examiner — Robert J Hance
(74) Attorney, Agent, or Firm — Lori Anne D. Swanson

(57) ABSTRACT

An advertisement status indicator method, system, and computer readable media implemented through a set-top box (STB) for determining Ad status during a program provides a user advance notice of the status of Ad playback. A request is received through the set top box to determine Ad status of one or more programs being broadcasted. The request may be access to an EPG grid displaying broadcasting information or a request to change channels. Ad status is determined for one or more programs being broadcasted. The Ad status is displayed to the user. Ad status may be based on Ad timing information and Time Offset/Date Table (TOT/TDT) values compared to Ad timing information generated with an Event Information Table (EIT). If the TOT/TDT value falls in a range of the Ad timing information, the Ad status of Ad playing is indicated to the user.

17 Claims, 5 Drawing Sheets

(56) References Cited

U.S. PATENT DOCUMENTS

| | | | |
|---|---|---|---|
| 2015/0222938 A1* | 8/2015 | Hasek | H04L 67/2823 725/92 |
| 2016/0029082 A1* | 1/2016 | Wordley | H04N 21/454 725/52 |

* cited by examiner

ADVERTISEMENT STATUS INDICATOR IN STB

1. FIELD OF THE INVENTION

This disclosure relates to advertisement status determination implemented with consumer and satellite integrated receiver/decoder (IRD) devices; and more particularly, to methods and systems for determining and monitoring programming and Ad playback status for set-top boxes (STBs) to provide a user advance notice of the status.

2. DESCRIPTION OF THE PRIOR ART

Standard set-top boxes (STBs), and wireless network Wi-Fi enabled set-tops (STAs), communicable with Multiple System Operators (MSOs) lack the capability to provide advanced notice to consumers, users or end-users, as to whether an advertisement/commercial/Ad is playing on a channel. When a user is browsing through a channel list, either through a main program guide or by using an info bar on the display screen being viewed, it is not possible for him/her to know if there is a program running or an Ad running on a channel of interest before selecting and changing (or switching) to the channel. It is annoying for the user, if after change/switching to the channel of interest, there is an Ad (advertisement/commercial) currently running or being displayed, or just about to run. Recordation of television programs through STB also results in recordation of the program as well as the advertisement or commercials. During playback, the user must constantly fast forward through the recorded advertisements to view the recorded program. This too is annoying to consumers and interrupts viewer enjoyment of the recorded program.

Typical STB systems do not provide channel or program Ad status to the end user with respect to Ad playback. If a user is browsing the channels through the STB, generally there is no mechanism that provides the ability for the user to be notified in advance if an Ad is playing on the channel of interest, unless he/she changes to the channel. Heretofore disclosed and/or utilized systems and methods in the art typically concentrate on systems and methods that typically offer content without Ads at a premium costs through service providers (for example, providers of direct non-commercial programming through services associated with the Trademarks Netflix, Amazon, Hulu, etc.), marketing the Ad free content as more palatable to the content providers.

Accordingly, there exists a need in the art for methods and systems that intelligently inform a user as to whether an Ad playback is running in a program airing on a channel, so that the user can choose whether to change/switch to that channel. Further, there is a need in the art to provide the ability to notify a user in advance as to Ad playback status in a program airing on a channel without adding additional hardware cost to the STB.

SUMMARY OF THE INVENTION

The present invention provides methods, systems, and computer readable media operable to intelligently inform a user of a channel status, in various user friendly forms, with respect to Ad playback. Use of the disclosed methods, systems, and computer readable media described herein provide middleware operable with an STB to determine Ad playback during a program airing on a channel and notify the user prior to switching to the program in order to provide a more enjoyable viewing experience. MSO providers can charge a premium for this feature, thereby providing a benefit to the MSO as well. Advantageously, the subject methods, systems, and computer readable media are operable with existing STBs without the need to add any additional hardware cost to the system.

In a first aspect of the invention there is provided an advertisement status indicator method implemented through a set-top box (STB) for determining Ad status during a program to provide a user advance notice of the Ad status. The method comprises: a) receiving a request through the set top box to determine Ad status of one or more programs being broadcasted; b) determining Ad status of the one or more programs being broadcasted; and c) displaying the Ad status to the user. The request may be to access an EPG grid displaying broadcast information for the one or more programs being broadcasted, wherein the Ad status is determined for one or more queried programs selected by the programs displayed on the EPG grid, and the Ad status for the one or more queried programs is displayed to the user. Alternatively, the request is a channel change request to change to a second program while accessing a first program, wherein the Ad status is determined for the second program; and the Ad status for the second program is displayed to the user. The Ad status is preferably determined based on (i) generating EIT data and Ad timing information at a Time Offset/Date Table (TOT/TDT) value for at least one program, (ii) parsing the Ad timing information from the EIT; (iii) determining if the TOT/TDT value falls in a range of the parsed Ad timing information, if the TOT/TDT value falls within the range of the parsed Ad timing then Ad status is Ad playing, if the TOT/TDT value does not fall within the range of the parsed Ad timing then the Ad status is Program playing; and (iv) indicating the Ad status of the program to the user.

In another aspect of the invention, an advertisement status indicator apparatus for determining Ad status during a program to provide a user advance notice of the Ad status associated through a set-top box (STB) is provided. The apparatus comprises: a) an interface configured to be used to receive a request through the set top box to determine Ad status of one or more programs being broadcasted; b) a processor configured to determine Ad status of the one or more programs being broadcasted; and c) a display configured to display the Ad status to the user.

In yet another aspect of the invention one or more non-transitory computer readable media having instructions operable to cause one or more processors to perform the operations comprising: a) receiving a request through a set top box to determine Ad status of one or more programs being broadcasted; b) determining Ad status of the one or more programs being broadcasted; and c) displaying the Ad status to the user.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
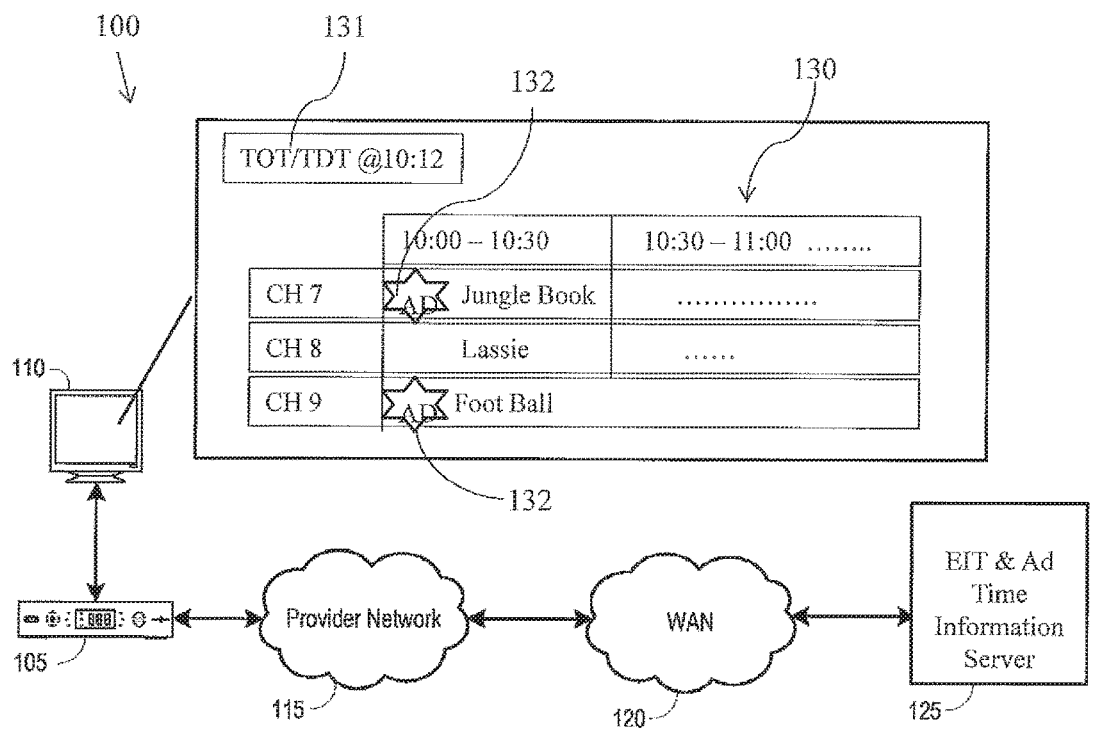
FIG. 1 is a block diagram illustrating an example network environment operable to facilitate real-time Ad status.

It is desirable to improve upon methods and systems for presenting advertisement or commercial timing status during television viewing or recordation for a user through software implemented on a STB or consumer integrated receiver/decoder (IRD) device. Methods and systems are described herein for generating a modified EIT table with Ad timing information, or commercial time information to provide an advertisement status indicator to a user. Throughout this application the term "user" is used, which generally herein refers to the end user, consumer or television viewer receiving MSO service. As used herein the terms "Ad" or "Ad playback" includes television advertisements, television commercials, commercials or ads, TVCs, TV adverts, adverts, or a span of television programming produced and paid for by an organization, which conveys a message, typically to market a product or service. Advertising revenue provides a significant portion of the funding for most privately owned television networks. Therefore, the subject invention can provide that an account service premium be paid by the user for enabling the subject advertisement status indicator function.

Advertisement status of a program is determined and communicated to the user through the subject system and method implemented with consumer and satellite integrated receiver/decoder (IRD) devices, STBs. More particularly, the subject invention is directed toward methods and systems for determining and monitoring programming and Ad playback status for set-top boxes (STBs) to provide a user advance notice of the status. The invention clearly improves the situation when compared to existing systems. In practice of the subject system and methods, the user is notified as to channel status well in advance prior to changing to the channel, so that he/she can change to a channel of interest when it is playing something useful rather than realizing that it is playing an Ad after already changing to the channel. Optionally, a reminder function may be enabled wherein the user can set a reminder, which will set off at the end of an Ad to notify the user that the Ad or Ads have concluded and remind the user to change to the channel of interest, so as not to miss any interesting portion of the program and avoiding annoying advertisements and/or commercials (Ads). The subject system and method provides an optional add-on software feature that can be enabled at a premium rate, subscription or cost to the end user by the MSO or broadcaster.

Electronic program guides (EPGs) and interactive program guides (IPGs) provide users of television and other media applications through menu-based systems that continuously updated menus to display broadcast programming or scheduled information for current and future programming. Event Information Table (EIT) data showing information on current and planned programs (events) in digital television is used electronic program guides (EPG) and time-controlled recordings. It is part of the DVB-SI and specified according to ETSI EN 300 468. Using this data, EPGs and IPGs typically also provide backward scrolling to promote catch content. These are commonly known as guides or TV guides. EPT information is continuously updated and downloaded by the STB when it is active.

Since the EPG information is downloaded by the STB every time it is active, the subject system and method provides a platform wherein additional information is included along with the EIT schedule information and EPG. This additional information includes listing out the details of Ad timing, embedded within the time of schedule of a particular program. The information can be carried in a private table, say EITAd [EIT Ad timing information Table] to avoid loading the EIT Schedule processing. The information is parsed by the middleware, and the software application handles the parsing and table generation depending on the Ad timing and user action of changing to the channel where the Ad is ongoing. The middleware computer software provides services to software applications beyond those available from the operating system, making it easier to implement communication and input/output and focus on the specific purpose of the application—herein to provide advertisement status to the user. For efficiency purpose, the middleware is adapted to process Ad information available at current program time.

FIG. 1 is a block diagram illustrating an example network environment 100 operable to facilitate real-time Ad status running with programs on channels in a downloaded EPG displayed on a screen to a user. In embodiments, a set-top box (STB) 105 may receive data and/or video services at a subscriber premise, and may output received multimedia content to a display device 110 (e.g., television). Content may be delivered to the STB 105 over one or more channels through a provider network 115 (e.g., hybrid fiber-coaxial network, fiber network, cellular network, high speed data network, etc.). Content may be provided by a wide-area network (WAN) 120, and a headend device may format and package the content for delivery over the provider network 115. For example, linear content (e.g., real-time content) associated with a channel may be delivered to the STB 105 over a specific frequency and/or wavelength associated with the channel.

The STB 105 may consult a program map table (PMT) to identify specific content received by the STB 105 as a multimedia stream, along with EIT and Ad timing information downloaded from one or more server 125. For example, a tuner at the STB 105 may be tuned to a specific channel based upon a channel selection made at the STB 105 by a user. The tuner may identify and prepare for processing multimedia content associated with an identified channel. Herein, the STB 105 is processing multimedia content downloaded from an EPG 130 viewable by a user on display 110.

The STB 105 may be a one-way STB configured to receive communications from the provider network 115 but without the ability to transmit upstream communications through the provider network 115. A tuner at the STB 105 may be used to allow a user to change content received and output for display by the STB 105.

In embodiments, the STB 105 may store EIT and Ad timing information content for output to a display device 110. EIT content may include title, content descriptors, start times, end time and other types of multimedia. Ad timing information and EITs may be downloaded by the STB 105 from server 125 and may be stored at the STB 105. The EIT and Ad timing information server 125 may be located at a network head-end (for example, see FIG. 2).

In embodiments, the STB 105 parses EIT and Ad timing information content. Preferably the STB's middleware i) downloads EPG information from the head end for the EIT data and Ad timing information (alternatively, wherein the middleware receives the EIT data and Ad timing information directly, this step can be bypassed), ii) parses Ad timing information stored in association with each program in the EIT and generates a modified EIT in a predetermined format. Alternatively, the Ad timing information is promulgated in a separate table from the EIT.

The middleware/software determines Ad status at a current Time Offset/Date Tables (TOT/TDT) value, herein shown as 10:12 at 131, initiated by a predetermined input. This predetermined input includes either a) when a user opens the guide/EPG screen and/or pauses scrolling for a time period [pauses for ≥2 seconds to indicate interest], or b) when a user is watching a first channel on the display screen and prompts a channel change to a second channel, at which time a banner appears on the screen of the first channel notifying the user of the Ad status (i.e. indicating that an Ad is running, or that the program on the second channel is running). The Ad status is determined at the TOT/TDT or current time down to the second by determining if the TOT/TDT falls in the range of the Ad timing information parsed from the EIT table for each of the programs in the EPG 130 listed on the display 110. If the TOT/TDT value falls within the Ad timing information then the software determines that an Ad is currently running, and an Ad status indicator—such as shown at 132 for example, is shown for the channel/program thereby providing the user advanced notice that an Ad is currently running on the channel.

When a user either initiates a channel change from a first channel to a second channel or the user opens the guide or EPG screen the STB 105 displays the Ad status to the user. For representative example, herein the user selects the guide and the EPG 130 is shown on the display 110. EPG 130 includes EIT information, such as program, content description of the program, channel and start and end time. The middleware/software determines if the current Time Offset/Date Tables (TOT/TDT) value, herein shown as 10:12 at 131, falls in the range of the Ad timing information parsed from the EIT table for each of the programs in the EPG 130 listed on the display 110. If the TOT/TDT value falls within the Ad timing information then the software determines that an Ad is currently running, and an Ad status indicator—such as shown at 132 for example, is shown for the channel/program thereby providing the user advanced notice that an Ad is currently running on the channel.

In another embodiment, when a use is currently watching a first channel, but desires to switch to another second channel, a banner may appear on the display 110 of the first channel notifying the user that the second channel is running an Ad. At which point, the user can either elect to switch to the second channel anyway, elect to switch automatically when the Ad is over, or simply cancel the prompt to switch to the second channel entirely.

Figure 2:
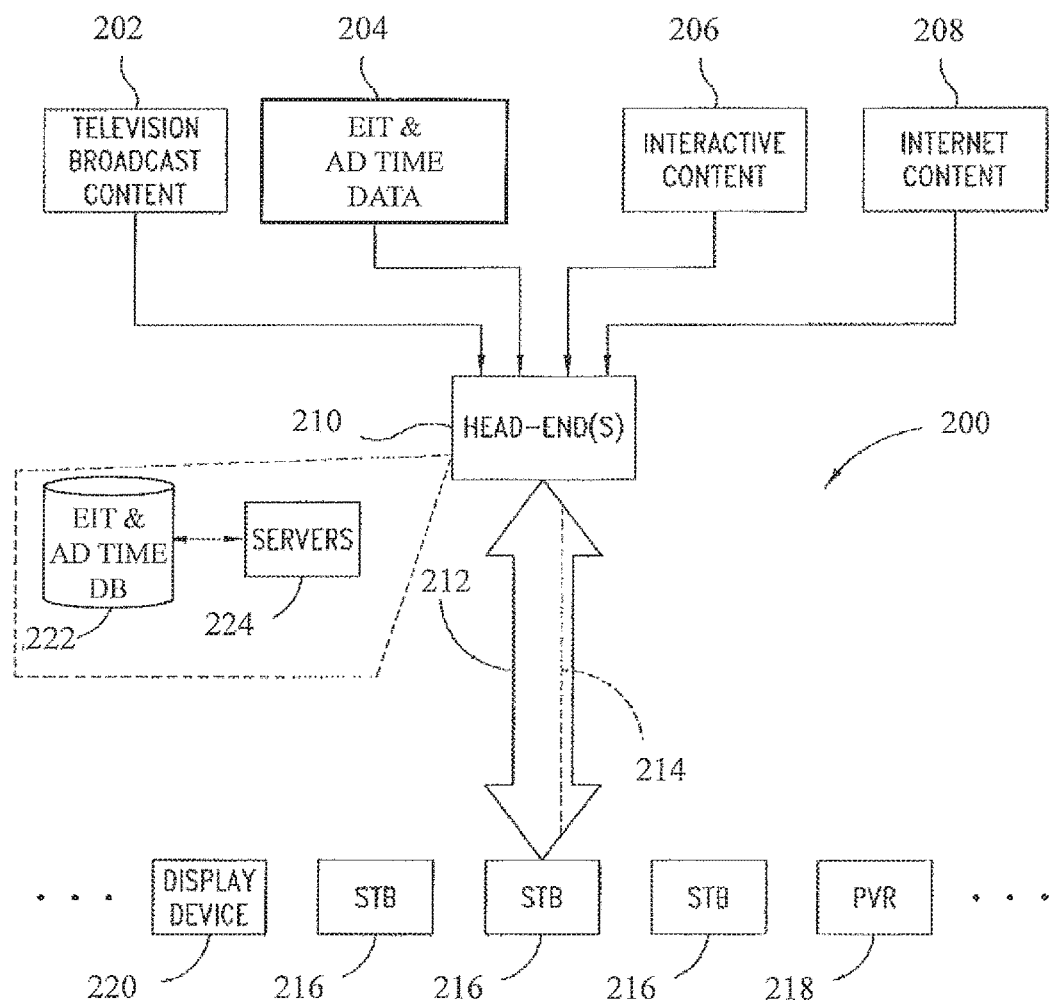
FIG. 2 is a block diagram of a system in which an embodiment of the invention may be implemented to provide dynamic EIT with Ad time data downloads.

FIG. 2 is a block diagram of a system 200 in which an embodiment of the invention may be implemented to provide dynamic EIT with Ad time data downloads. The system includes a television broadcast content source 202 to provide television programs and other video for distribution to viewers. The television content source 202 can comprise television networks and broadcasters, local or national television studios, production studios, and other known types of video content providers.

The system 200 includes an EIT data and Ad timing information production source 204 to generate EIT data and Ad timing information. The EIT data and Ad timing information production source 204 may be provided by a party such as multiple system operator (MSO), production studio, broadcaster, or other party having the capability to generate EPG data and Ad timing information that can be downloaded to viewer televisions or other receiving devices. The EIT data and Ad timing information production source 204, by having access to television broadcast schedules, content subject matter information, channel lineups for different geographical viewing regions, etc., and ad time information/advertisement slots can process all of this information into EIT data and Ad timing information that can be distributed to the relevant viewing regions. There are several techniques known in the art for generating EIT data, and for the sake of brevity, such techniques will not be described in detail herein.

EIT data is transmitted as a group of data elements on an MPEG stream, containing the details of specific TV programs, including the program name, start time, duration, genre and possibly age rating. Ad timing information may be transmitted as part of the EIT or may be transmitted as a separate group of data elements linked to the EIT and containing the details of specific Ad timing events for the specific TV programs in the EIT so that the EIT data and Ad timing information data include the program name, start time, ad time information [start time-end time], program duration, genre and possibly age rating. Typically, the EITs are used by the middleware of the set top box to create an on-screen Electronic Program Guide (EPG). Wherein the middleware of the STB is further downstream, the EPG can be used to determine the EIT data and Ad timing information, which is then parsed to determine if a specific channel is running an Ad at a specific TOT/TDT to generate the Ad status and display same to the user on the display screen.

If the system 200 provides interactive television capabilities to its viewers, the system 200 may include one or more interactive content sources 206. For instance, an MSO may operate the interactive content source 206 to provide its viewers with supplemental information that accompanies television broadcasts, interactive content channels, on-line electronic commerce opportunities, interactive content via an EPG, and the like. The system 200 may also include an Internet content source 208, such as servers, web sites, portals, or other mechanism by which viewers may access the Internet via their televisions.

The sources 202-208 are in turn coupled to one or more distribution centers, such as head-ends 210. Each head-end 210 typically services televisions in a particular viewing area, by receiving content from the sources 202-208 and then distributing the content to its subscriber televisions. The head-end 210 includes or is otherwise coupled to an EIT and Ad timing information database 222. The EIT and Ad timing information database 222 stores EIT and Ad timing information received from the EIT and Ad timing information data production source 204 (typically EIT data corresponding to television programming or other content intended for receiving devices served by the head-end 210). The EIT and Ad timing information database 222 can also store updated or corrected EIT data, updated/corrected Ad timing information, EIT data that has been processed (such as via addition of graphics, links, or other type of processing) subsequent to being received from the EIT and Ad timing information data production source 204, EIT and Ad time data that has been addressed or otherwise prepared for transmission to appropriate receiving devices, and so forth.

It is appreciated that the EIT and/or Ad time data need not necessarily be stored in the EIT and Ad time database 222. The EIT and/or Ad time data may be stored in other machine-readable media or data repository in formats other than database entries. For example, the EPG data may be stored as files, text, extensible markup language (XML) objects, and others and combinations thereof.

One or more server(s) 224 is coupled to the EIT and Ad time database 222 to process the EIT and Ad time data stored therein and to send the EIT and Ad time data to the appropriate receiving devices. For instance, the server 224 can receive queries for certain pieces of EIT data, retrieve that requested Ad time data for the certain pieces of EIT data and determine whether an ad is currently running from the EIT and Ad time database 222, format the retrieved data (if necessary), and then send the data to the receiving device that sent the query. Alternatively or in addition, the server 224 can pull pieces of EIT and Ad time data from the database 222 and periodically broadcast (or multicast) that EIT and Ad time data to receiving devices. It is noted that the EIT and Ad time data may be in separate databases or may promulgated in a predetermined format in a database.

The server 224 can be embodied in different formats according to various embodiments of the invention. The server 224 can be a carousel server, or use other transmission techniques different from carousel broadcasting, including a query and response technique. The server 224 need not necessarily be used to send EIT and/or Ad time data. Those skilled in the art having the benefit of this disclosure would appreciate that non-server devices may be used to dynamically provide EIT and/or Ad time data in accordance with an embodiment of the invention. Thus, the EIT and Ad time database 222 and the server 224 comprise only one example of an EIT and Ad time data source that may be used in an embodiment of the invention.

In one embodiment, each head-end 210 distributes its content to subscriber televisions by way of a distribution network 212 in the form of a hybrid fiber coaxial (HFC) cable distribution network. The content distributed via the distribution network 212, such as video programs, can be in analog or digital. For instance, content transmitted in digital form can be transmitted via Motion Pictures Expert Group (MPEG) streams. It is appreciated that the distribution network 212 need not necessarily be limited to hardwire distribution networks. For example, all or parts of the distribution network 212 can comprise optical, satellite, radio frequency, microwave, or other wireless link. Moreover, the distribution network 212 may comprise combinations of both hardwire and wireless links.

In one embodiment, the distribution network 212 can include one or more EIT and/or Ad timing information communication links 214 that provide EIT and/or Ad time data to receiving devices. The EIT and/or Ad time communication link 214 can comprise an out-of-band channel, which is a frequency carried by the coaxial cable that is dedicated for EIT and/or Ad time data (or other additional information). As a person skilled in the art having the benefit of this disclosure would appreciate, the EIT and/or Ad time communication link 214 can be provided via other techniques in some embodiments. These techniques may include, but not be limited to, MPEG streams, analog transmissions, Ethernet or Internet connection, download via telephone lines, and so forth.

One or more STBs 216 are communicatively coupled to the distribution network 212 to receive the television broadcasts, EIT and Ad time data, interactive content, etc. from the head-end 210. The STBs 216 may be separate devices coupled to televisions, or televisions may have built-in STB functionality. Alternatively or in addition, other types of receiving devices may be coupled to the distribution network 212 to receive EIT and Ad time data. One example is a personal video recorder (PVR) 218 that can record programming and other content sent via the distribution network 212, and in one embodiment, can also query for and process EIT and Ad time data. It is appreciated that any of the STBs 216 may also have this PVR functionality.

Alternatively or in addition, display devices 220 can also comprise the receiving devices that are capable to receive and process EIT and Ad time data sent via the distribution network 212. These display devices 220 can include, according to various embodiments, televisions with STB functionality, wireless devices, personal computers, pagers, or other type of display device that can request and process EIT and Ad time data.

Figure 3:
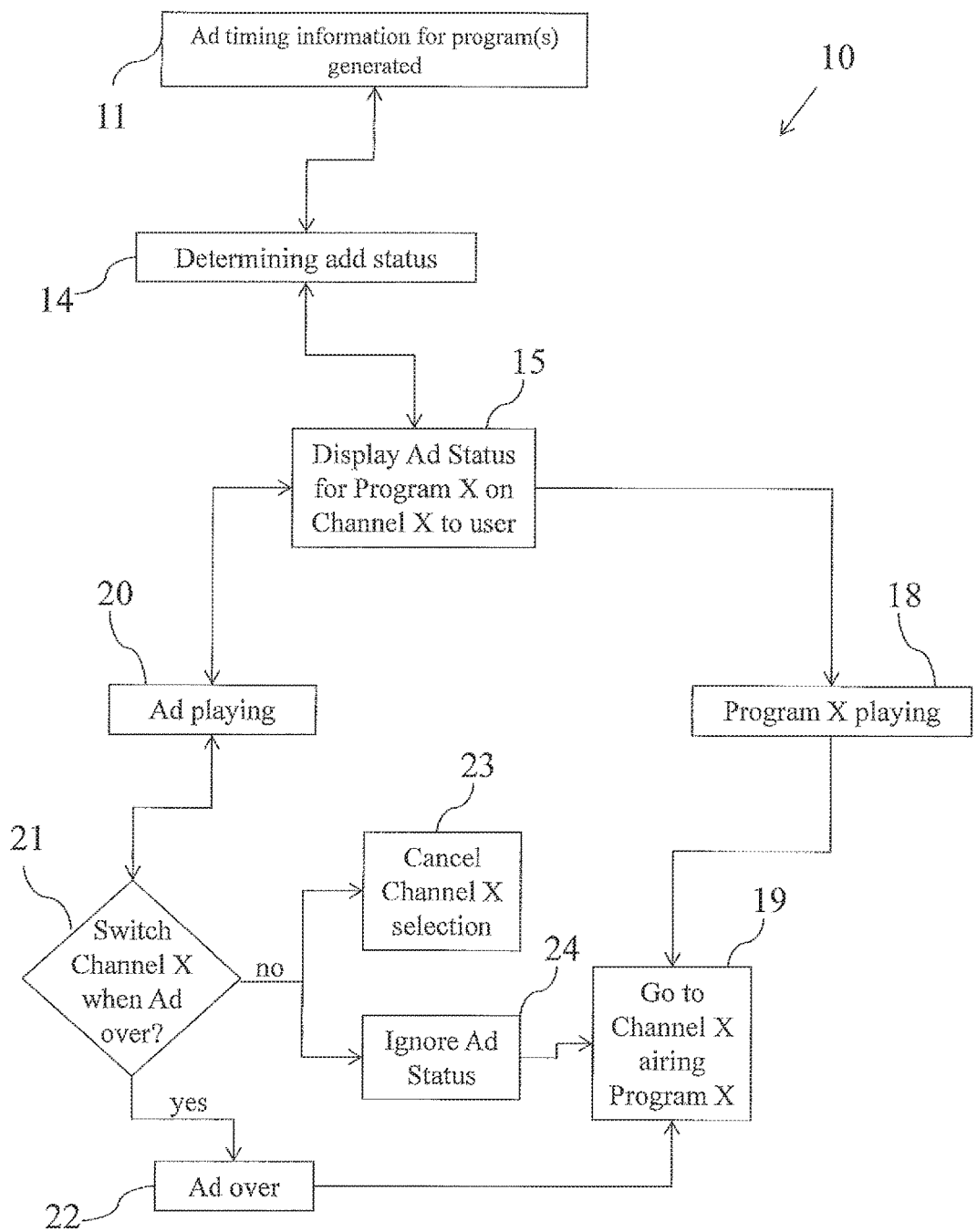
FIG. 3 is a flowchart illustrating steps of an embodiment of the subject method and system.

FIG. 3 is a flowchart, shown generally at 10, illustrating steps of an embodiment of the subject method and system. Note the steps may be rearranged in a different order. Ad timing information is generated, shown generally at 11, for program(s) in association with an Event Information Table (EIT). Preferably, Ad timing information for all the programs in the EIT table is determined and a modified EIT table is promulgated in a predefined format, yielding a modified EIT Ad timing Table. On acquisition of the EIT table, implemented middleware will construct the Ad timing table in the memory as follows using optimal data structure to promulgate the modified EIT table with Ad timing information that can readily be extrapolated to provide Ad status to the user. Predefined format of the EIT table includes the modified EIT Ad timing Table, which includes: i) each entry or program event, typically containing a 14-bit event ID and 16-bit source ID for the virtual channel, uniquely identifying that event, and ii) Ad timing information. Each entry or program event includes the designated/virtual channel, a start time and duration (or end time), and a string giving the title. Ad timing information is also presented, preferably in the EIT table.

Ad timing is preferably determined by information from the broadcaster related to Ad start time and Ad end time for generally a block of adds run throughout a program. For example, "Program A" timing is 9:00 am to 9:30 am, and the Ad timing information from the broadcaster is determined for Program A and can be embedded in the EIT structure for Program A. A simple proposal can be: Program A—air time on Channel A: Program 9:00 am to 9:30 am; Ad Timing Info: 9:12 am to 9:15 am; 9:24 am to 9:27 am.

Alternatively, broadcast standards, where available and/or applicable, may be utilized for determining Ad timing info and extrapolating Ad timing information for the EIT. These standards may include specific standard times set during programming wherein Ad or television advertisement spots are set ranging in length from a few seconds to several minutes [i.e. 1 hour program; Ad spots standard set to start after every 12 minutes of program for roughly 41-48 minutes of program run time; 3 minutes of commercials/Ad spots per 4× for roughly 12 minutes of Ad time total spread out over the four commercial ~3 minute intervals]. Wherein standard television and/or cable advertisement spot guidelines are implemented (or when broadcaster related Ad timing is not provided) an algorithm is carried out that determines approximately when the Ads are run to determine Ad timing, which is then promulgated in the EIT table of the subject invention.

When the STB's middleware downloads the EPG information from the head end, it also parses the Ad information stored, along with each program's information, in the EIT table. Preferably, the STB's middleware or software: i) downloads EPG information from the head end for the EIT table, ii) parses Ad timing information, iii) parses the Ad information stored in association with each program information in the EIT table and generates a modified EIT table in the predetermined format. This information will be made available to the application to indicate to the user the status of the channel, whether an Ad is playing or the program is playing. The STB's middleware optionally continuously reloads or updates the modified EIT table when the STB is turned on. Alternatively, the STB middleware application is initiated when the user selects Program X airing Channel X either from the guide or when watching another program (Program B) on another channel (Channel B).

As indicated at 14, a predetermined input signals initiation for determining Ad status based on Ad timing information and Time Offset/Date Table (TOT/TDT) values when a User selects Program X on Channel X. This predetermined input activates the method when, for non-limiting example, an event takes place, such as when the user prompts a channel/program selection, the use opens the EPG grid and browses the grid, when the STB is activated or turned on, when a user schedules a recording which thereby activates the method when the recording begins.

The status of the channel, with respect to Ad playback is shown to the user in a user friendly format, depending on the mechanism of the channel browsing the user is currently using, shown generally at 15. For example, the user may be browsing in the main programming guide menu or the user may be viewing a Program X on Channel X and wish to change to change to another program, Program A on Channel A, and a tab bar may appear on the screen of Channel X indicating the status—"Ad" or "no Ad" currently regarding Program A on Channel A. If the current Time Offset/Date Tables (TOT/TDT) value falls in the range of the Ad timing information parsed from the EIT table it is determined that an Ad is currently playing and the Ad status is indicated to the user through user friendly format. If the program is being displayed/Program X playing 18 as determined by the parsed modified EIT table, the channel may immediately be switched/selected (from the guide) to the desired program, i.e. Program X, as shown at 18 and 19, respectively.

If it is determined by the middleware that an Ad is playing [TOT/TDT falling within Ad time], the user may be notified by an icon in the guide or on the tab bar, shown generally at 20. When the Ad or Ads are concluded, the icon may disappear, thereby indicating the program is being displayed/running. An icon indicating program in play may be presented to the user in the guide or on the tab bar. Alternatively, the user may be presented with a query as to whether to switch to the channel anyway or not/switch when Ad(s) complete and program resumed, shown generally at 21. If the user selects "yes", when the Ad(s) are over at 22, and Program X is about to air, the channel is automatically changed to Channel X at 19. If the user selects "no", the user can cancel the Channel X selection 23 or scroll on, or choose to ignore the ad status at 24 and switch to Channel X anyway at 19. The user may choose to simply do nothing and wait for the ad icon to disappear, thereby indicating the ad is over and the program is airing.

User friendly formats for notifying the user of Ad status in "playback" may vary depending on the tool the user is using when the method is activated. If the user is browsing the channel using the info bar, along with channel information, like name and timing, an "AD" icon can blink continuously making the user aware that the channel selected on the info bar is currently playing an Ad. If the user is utilizing a channel up/down key or numeric key to change to a program, the Ad status is indicated to the user by a popup warning message indicating that the program selected is playing an Ad and prompting the user as to whether the user would like to still change to the program. If the user is utilizing browsing in an electronic programming guide (EPG) grid, the Ad status is indicated to the user through a color code on the EPG grid.

Preferably, if user uses channel up/down key or numeric key to change to a channel, then a popup warning message indicating that "Selected channel is playing an Ad and would the user like to still change to the channel" can be flashed on the TV screen. Thereby making the user aware of the channel status and asking his/her confirmation. If the user is browsing the channel using the EPG grid, then the channel status of the currently selected channel on the grid can be indicated through a color code. For example, the channel grid can be grayed out, if it is currently playing an Ad. If the user still tries to change to channel when an Ad is playing, the mechanism, i.e. the popup warning message, can be used.

The Ad timing information may be stored as part of event information in the EIT table. Preferably, to keep it straightforward, this information is stored in the title_text field per event in the last extended descriptor field. In order to identify the presence of this information in the text field the following format can be used, for representative non-limiting example, in the text field—text length: 100 (0x64) text: "Ad timing—<start_time1 or offset1><duration1><start_time2 or offset2><duration2> . . . <start_timen or offsetn><durationn>

The middleware can receive the length of text and Ad timing information, and using this Ad timing information it can process the Ad time for various listed cases. Once the Ad timing information is available in a pre-determined format in the EIT table, the use case can be extended even for scheduled recordings. In this manner, when a user schedules recordation of a program, the modified EIT table is generated and the Ad timing information extrapolated therefrom and commands activated during the recording to pause recordation during the Ad times demarcated by the Ad timing information. The user then has a recorded program without advertisements for continuous, seamless viewing pleasure. At the time of scheduling the recordation the user may be prompted to "record without Ads", whereupon the user can select yes or no. The MSO can at that point provide a cost associated with the Ad free recordation, which cost can be added to the user's monthly bill. Conversely, the MSO may charge a flat premium monthly fee for the subject Ad free service.

On acquisition of the EIT table, the middleware will construct the Ad timing table in the memory as follows using optimal data structure to promulgate the modified EIT table with Ad timing information that can readily be extrapolated to provide Ad status to the user. [See Table I below, a non-limiting representative portion of a modified EIT table with Ad timing, generated in accordance with the subject invention]

TABLE I

| [EITAd Table] | | | |
|---|---|---|---|
| | Event-1 | Event-2 | . . . Event-m |
| Program-1 | <Start_time1> | <Start_time1> | <Start_time1> |
| | <Duration1> | <Duration1> | <Duration1> |
| | <Start_time2> | <Start_time2> | <Start_time2> |
| | <Duration2> | <Duration2> | <Duration2> |
| | . . . | . . . | . . . |
| | <Start_timen> | <Start_timen> | <Start_timen> |

TABLE I-continued

[EITAd Table]

|  | Event-1 | Event-2 | ... | Event-m |
|---|---|---|---|---|
|  | <Durationn> | <Durationn> |  | <Durationn> |
| Program-2 | <Start_time1> | <Start_time1> |  | <Start_time1> |
|  | <Duration1> | <Duration1> |  | <Duration1> |
|  | <Start_time2> | <Start_time2> |  | <Start_time2> |
|  | <Duration2> | <Duration2> |  | <Duration2> |
|  | ... | ... |  | ... |
|  | <Start_timen> | <Start_timen> |  | <Start_timen> |
|  | <Durationn> | <Durationn> |  | <Durationn> |

... And so on

"Event" indicates an Ad event—or Ad timing information. Typically these Events, Event-1, Event-2 . . . Event-m indicate the spaced out commercial Ad slots for television programming. For example, one hour programs typically run for 41-48 minutes with anywhere from 19-12 minutes of Ads sum total divided by four (Ad slots run at every quarter of programming time, for example). When the user activates one of the use cases/queries one of the Programs listed in generated table, the middleware traverses through the modified EIT table to retrieve the Ad information of the selected program and event (Ad timing information) in order to determine the Ad playing status of selected item.

Figure 4:
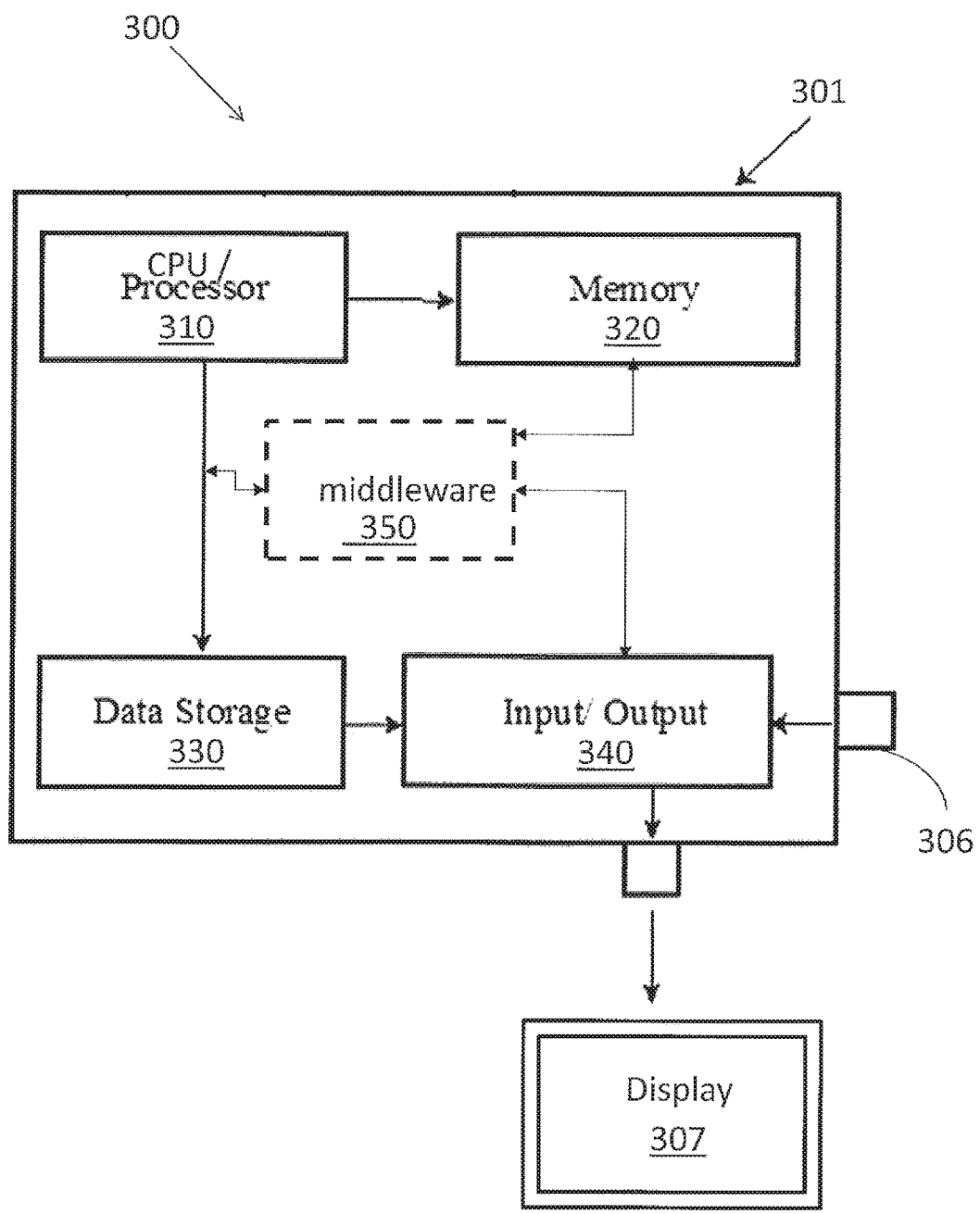
FIG. 4 is an architecture diagram of elements of a STB operable with the subject invention.

FIG. 4 is an architecture diagram of elements of a STB operable with the subject invention, shown generally at 300. STB 301 is shown as a source device or apparatus for implementation of the subject invention. The STB 301 includes hardware generally configured having a module including a CPU/processor 310, a memory 320, a storage device 330, and an input/output device 340. Interface user application layer, middleware 350, is illustrated for functional purposes to aid in understanding the invention. Each of the components 310, 350, 320, 330, and 340 can, for example, be interconnected using a system bus. The processor 310 can be capable of processing instructions for execution of the subject method, system and computer readable media within the hardware configuration 300. STB 301 includes network connection to a service provider 306. STB 301 is connected through a high-definition multimedia interface (HDMI) 307 to a display device, herein a television.

Figure 5:
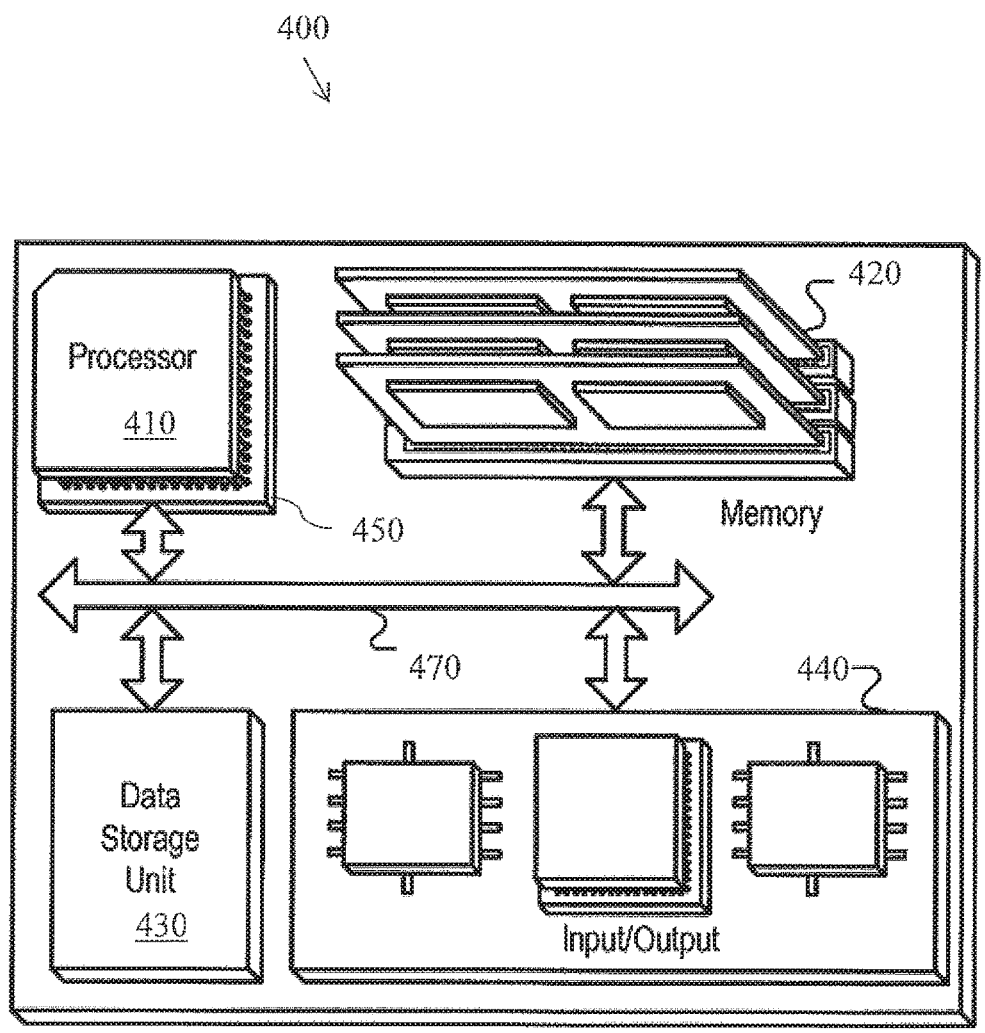
FIG. 5 is a block diagram of a hardware configuration operable to facilitate the initiation of the subject method and system.

FIG. 5 is a block diagram of a hardware configuration operable to facilitate the initiation of the subject method, shown generally at 400. The hardware configuration can include a processor 410, a memory 420, a storage device 430, decoder 450 and an input/output device 440. Each of the components 410, 420, 430, 450 and 440 can, for example, be interconnected using a system bus 470. The processor 410 can be capable of processing instructions for execution of the subject method, system and computer readable media within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430. The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit. In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400. The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., Access point, cable modem, router, wireless extender, or other access device) or subscriber device (e.g, STB, etc.). In another implementation, the input/output device can include driver devices configured to send communications to, and receive communications from one or more networks (e.g., WAN, local network, cloud, headend/cloud controller, etc.).

The subject matter of this disclosure, and components thereof, can be realized by software instructions that upon execution cause one or more processing devices to carry out the processes and functions described above. Such instructions can, for example, comprise interpreted instructions, such as script instructions, e.g., JavaScript or ECMAScript instructions, or executable code, SoftAp mode pulse timing activation and deactivation instructions, signal strength activation and deactivation software, initial fingerprint (birth certificate) algorithmic and execution instructions, activation signals or software, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An advertisement status indicator method implemented through a set-top box (STB) for determining an advertisement status during a program to provide to a user advance notice of the advertisement status, the method comprising:

receiving, via a digital video broadcasting (DVB) receiver, an Event Information Table (EIT) from a provider of the one or more programs,
wherein said EIT includes a first portion with program schedule information and a second portion with an advertisement status for each of the one or more programs identified in the EIT,
wherein said advertisement status second portion of the EIT is received via the same DVB receiver,
wherein said program schedule information first portion is parseable separately from said advertisement status second portion, said program schedule information first portion is parsed for information for each of the one or more programs in the EIT for display of an event program guide (EPG) and said advertisement status second portion is parseable for determining the advertisement status of the one or more programs currently being broadcasted;
parsing, via middleware in the STB, the EIT for program schedule information first portion for one or more programs being broadcasted for displaying an event program guide (EPG), wherein said middleware is operable for parsing the EIT separately for an advertisement status at a current program time in response to a user action related to a program in the one or more programs included in the EIT, said a current program time for the program being broadcasted, said determining the advertisement status of the program being broadcasted by parsing said advertisement status second portion of the Event Information Table (EIT) to determine whether a Time Offset/Date Table (TOT/TDT) value for the program in the one or more programs currently being broadcasted falls within a range of the parsed advertisement timing information,
if the TOT/TDT value falls within the range of the parsed advertisement timing, then setting the advertisement status to an indication that an advertisement is playing, and
if the TOT/TDT value does not fall within the range of the parsed advertisement timing, then setting the advertisement status to an indication that an advertisement is not playing; and
displaying the advertisement status of the at least one program to the user.

2. The method of claim 1, wherein the request is to access an electronic program guide (EPG) grid displaying broadcast information for the one or more programs being broadcasted, wherein the advertisement status is determined for one or more queried programs selected by the programs displayed on the EPG grid, and the advertisement status for the one or more queried programs is displayed to the user.

3. The method of claim 1, wherein the request is a channel change request to change to a second program while accessing a first program, wherein the advertisement status is determined for the second program, and the advertisement status for the second program is displayed to the user.

4. The method of claim 1, further comprising:
using the advertisement timing information to modify the EIT by populating at least a field of the EIT with the advertising timing information in a predefined format, and thereby generate a modified EIT comprising an advertisement timing table.

5. The method of claim 4, wherein the modified EIT advertisement timing table comprises entry of program events including: a designated/virtual channel; a start time and either a duration or an end time; a string giving a title of the program; and advertisement timing information.

6. The method of claim 1, further comprising:
using the advertisement timing information to populate an advertisement timing table that is separate from the EIT.

7. The method of claim 1, wherein if the user is browsing the program using an electronic program guide, the advertisement status is indicated by to the user by an icon displayed in the electronic program guide that continuously blinks during an advertisement, the blinking for signifying to the user that the advertisement is playing.

8. The method of claim 1, wherein if the user is utilizing a channel up/down key or numeric key to change to a program, the advertisement status is indicated to the user by a pop-up message indicating that the program selected is playing an advertisement and prompting the user to elect an option for continuing to change to the program.

9. An advertisement status indicator apparatus for determining advertisement status during a program to provide to a user advance notice of the advertisement status associated through a set-top box (STB), comprising:
an interface configured to be used to:
receive, via a digital video broadcasting (DVB) receiver, an Event Information Table (EIT) from a provider of the one or more programs,
wherein said EIT includes a first portion with program schedule information and a second portion with an advertisement status for each of the one or more programs identified in the EIT,
wherein said advertisement status second portion of the EIT is received via the same DVB receiver;
wherein said program schedule information first portion is parseable separately from said advertisement status second portion, said program schedule information first portion is parsed for information for each of the one or more programs in the EIT for display of an event program guide (EPG) and said advertisement status second portion is parseable for determining the advertisement status of the one or more programs currently being broadcasted;
middleware operable with the STB, the middleware configured to:
parse the EIT for program schedule information first portion for one or more programs being broadcasted for displaying an event program guide (EPG), wherein said middleware is operable to parse the EIT separately for an advertisement status at a current program time in response to a user action related to a program in the one or more programs included in the EIT, said current program time for the program being broadcasted, determine the advertisement status of the program being broadcasted by parsing said advertisement status second portion of the Event Information Table (EIT) to determine whether a Time Offset/Date Table (TOT/TDT) value for the program in the one or more programs currently being broadcasted falls within a range of the parsed advertisement timing information,
wherein if the TOT/TDT value falls within the range of the parsed advertisement timing, then the advertisement status is set to an indication that an advertisement is playing, and if the TOT/TDT value does not fall within the range of the parsed advertisement timing, then the advertisement status is set to an indication that an advertisement is not playing; and
a display configured to display the advertisement status of the at least one program to the user.

10. The apparatus of claim 9, wherein the processor is further configured to:
generate advertisement timing information for the program in association with an Event Information Table (EIT);
parse the advertisement timing information from the EIT;
determine whether a Time Offset/Date Table value falls within a range of the parsed advertisement timing information; and
indicate the advertisement status of the program to the user.

11. The apparatus of claim 10, wherein:
a modified EIT comprising an advertisement timing table is generated by using the advertisement timing information to modify the EIT by populating at least a field of the EIT with the advertising timing information in a predefined format; and
the advertisement timing table comprising program event information including: a designated/virtual channel; a start time and either a duration or an end time; a string giving a title of the program; and advertisement timing information.

12. The apparatus of claim 10, wherein the processor is further configured to:
use the advertisement timing information to populate an advertisement timing table that is separate from the EIT.

13. One or more non-transitory computer readable media having instructions operable to cause one or more processors to perform operations comprising:
receiving, via a digital video broadcasting (DVB) receiver, an Event Information Table (EIT) from a provider of the one or more programs,
wherein said EIT includes a first portion with program schedule information and a second portion with an advertisement status for each of the one or more programs identified in the EIT,
wherein said advertisement status second portion of the EIT is received via the same DVB receiver;
wherein said program schedule information first portion is parseable separately from said advertisement status second portion, said program schedule information first portion is parsed for information for each of the one or more programs in the EIT for display of an event program guide (EPG) and said advertisement status second portion is parseable for determining the advertisement status of the one or more programs currently being broadcasted;
parsing the EIT for program schedule information first portion for one or more programs being broadcasted for displaying an event program guide (EPG);
in response to a user action related to a program in the one or more programs included in the EIT, at a current program time for the program being broadcasted, determining the advertisement status of the program being broadcasted by parsing said advertisement status second portion of the Event Information Table (EIT) to determine whether a Time Offset/Date Table (TOT/TDT) value for the program in the one or more programs currently being broadcasted falls within a range of the parsed advertisement timing information,
if the TOT/TDT value falls within the range of the parsed advertisement timing, then setting the advertisement status to an indication that an advertisement is playing, and
if the TOT/TDT value does not fall within the range of the parsed advertisement timing, then setting the advertisement status to an indication that an advertisement is not playing; and displaying the advertisement status of the at least one program to the user.

14. The non-transitory computer readable media of claim 13, wherein the request is to access an electronic program guide (EPG) grid displaying broadcast information for the one or more programs being broadcasted, wherein the advertisement status is determined for one or more queried programs selected by the programs displayed on the EPG grid, and the advertisement status for the one or more queried programs is displayed to the user.

15. The non-transitory computer readable media of claim 13, wherein the request is a channel change request to change to a second program while accessing a first program, wherein the advertisement status is determined for the second program, and the advertisement status for the second program is displayed to the user.

16. The non-transitory computer readable media of claim 13, wherein:

a modified EIT advertisement timing able comprising an advertisement timing table is generated by using the advertisement timing information to modify the EIT by populating at least a field of the EIT with the advertising timing information in a predefined format; and the advertisement timing table comprising program event information including: a designated/virtual channel; a start time and either a duration or an end time; a string giving a title of the program; and advertisement timing information.

17. The non-transitory computer readable media of claim 13 further comprising using the advertisement timing information to populate an advertisement timing table that is separate from but associated with the EIT.

* * * * *